(12) United States Patent
Kim

(10) Patent No.: US 8,514,362 B2
(45) Date of Patent: Aug. 20, 2013

(54) LIQUID CRYSTAL DISPLAY DEVICE INCLUDING PROTECTION PAD

(75) Inventor: Gi-Bin Kim, Annyang-si (KR)

(73) Assignee: LG Display Co. Ltd., Seoul (KR)

( * ) Notice: Subject to any disclaimer, the term of this patent is extended or adjusted under 35 U.S.C. 154(b) by 1510 days.

(21) Appl. No.: 11/288,601

(22) Filed: Nov. 29, 2005

(65) Prior Publication Data
US 2007/0002256 A1 Jan. 4, 2007

(30) Foreign Application Priority Data
Jun. 29, 2005 (KR) .................. 10-2005-0057102

(51) Int. Cl.
G02F 1/133 (2006.01)
G02F 1/1333 (2006.01)
G02F 1/1345 (2006.01)

(52) U.S. Cl.
USPC .............. 349/151; 349/72; 349/150; 349/161

(58) Field of Classification Search
USPC .................................. 349/72, 150, 161, 151
See application file for complete search history.

(56) References Cited

U.S. PATENT DOCUMENTS

| | | | | |
|---|---|---|---|---|
| 4,995,451 A | * | 2/1991 | Hamburgen | 165/104.33 |
| 5,606,440 A | * | 2/1997 | Kawaguchi et al. | 349/188 |
| 5,680,183 A | * | 10/1997 | Sasuga et al. | 349/58 |
| 5,838,412 A | * | 11/1998 | Ueda et al. | 349/150 |
| 6,097,598 A | * | 8/2000 | Miyahara et al. | 361/704 |
| 6,519,020 B1 | | 2/2003 | Cha et al. | |
| 6,534,722 B2 | * | 3/2003 | Takaoka | 174/254 |
| 6,657,620 B2 | * | 12/2003 | Oishi et al. | 345/204 |
| 7,365,821 B2 | * | 4/2008 | Dewa et al. | 349/161 |
| 2002/0021997 A1 | * | 2/2002 | Taomoto et al. | 423/448 |

FOREIGN PATENT DOCUMENTS

| | | |
|---|---|---|
| CN | 1591745 A | 3/2005 |
| JP | 03-010224 | 1/1991 |
| JP | 04-113322 | 4/1992 |
| JP | 05-257166 | 10/1993 |
| JP | H10-333173 | 12/1998 |
| JP | 2000-214478 | 8/2000 |
| JP | 2000-223629 | 8/2000 |
| JP | 2002-111261 | 4/2002 |
| JP | 2004-119683 | 4/2004 |

OTHER PUBLICATIONS

Office Action for corresponding Chinese Patent Application Serial No. 2005101092016, dated Nov. 23, 2007.
Office Action issued in corresponding Taiwanese Patent Application No. 094143228; issued Apr. 14, 2009.
Office Action issued in corresponding Japanese Patent Application No. 2005-374197; mailed Jun. 3, 2009.
Office Action issued in corresponding Korean Patent Application No. 10-2005-0057102, mailed Sep. 14, 2011.

* cited by examiner

*Primary Examiner* — Mark Robinson
*Assistant Examiner* — Jerry Blevins
(74) *Attorney, Agent, or Firm* — Brinks Hofer Gilson & Lione

(57) ABSTRACT

A liquid crystal display device includes a liquid crystal display panel a driving integrated circuit connected to the liquid crystal display panel and a protection pad disposed on the driving integrated circuit, wherein the protection pad is formed from a material that substantially limits the maximum temperature of the protection pad.

12 Claims, 7 Drawing Sheets

LIQUID CRYSTAL DISPLAY DEVICE INCLUDING PROTECTION PAD

The present invention claims the benefit of Korean Patent Application No. 2005-57102, which was filed in Korea on Jun. 29, 2005, and is hereby incorporated by reference.

BACKGROUND OF THE INVENTION

1. Field of the Invention

The present invention relates to a liquid crystal display (LCD) device, more particularly, to an LCD device including a driving integrated circuit (IC) that can be protected against heat thereof.

2. Description of the Related Art

Flat panel display (FPD) devices that have a relatively light weight, a thin profile, and a low power consumption characteristics are being developed and commonly used as a substitute for cathode ray tube (CRT) devices. Generally, display devices may be classified according to their ability for self-emission, and may include emissive display devices and non-emissive display devices. Emissive display devices display images by taking advantage of their ability to self-emit light, while the non-emissive display devices require a light source because they do not emit light by themselves. For example, plasma display panel (PDP) devices, field emission display (FED) devices, and electroluminescent display (ELD) devices are commonly used as emissive display devices. Liquid crystal display (LCD) devices, which may be categorized as non-emissive display devices, are commonly used in notebook and desktop computers because of their high resolution, capability of displaying color images, and high quality image display.

A LCD module of an LCD device includes an LCD panel for displaying images to an exterior of the LCD panel and a backlight unit for supplying light to the LCD panel. The LCD panel normally includes two substrates facing and spaced apart from each other, and a liquid crystal material interposed therebetween. Liquid crystal molecules of the liquid crystal material have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electrodes, wherein transmittance of the LCD panel is changed based on the polarization properties of the liquid crystal material. However, since the LCD panel is a non-emissive-type display device, an additional light source is required. Thus, a backlight unit is disposed under the LCD panel, and the LCD device displays images using light produced by the backlight unit.

Among the various types of LCD devices commonly used, active matrix LCD (AM-LCD) devices have been developed because of their high resolution and superiority in displaying moving images. Generally, the AM-LCD device includes a first substrate having a thin film transistor (TFT) in each pixel region as a switching device, a pixel electrode in each pixel region, and a second substrate having a black matrix corresponding to a boundary between the pixel regions. Additionally, the AM-LCD device includes red, blue, and green color filters that correspond to each of the pixel regions, and a common electrode over the black matrix and the color filter layer.

FIG. 1 is a schematic perspective view of an LCD device according to the related art. As shown in the figure, the LCD device 1 includes an LCD panel 2 and a backlight unit under the LCD panel 2 as a light source. The LCD panel 2 includes a first substrate 10, a second substrate 12 facing the first substrate 10, and a liquid crystal layer (not shown) interposed between the first and second substrates 10 and 12. Although not shown, the first substrate 10 includes a first display region and a non-display region, and the second substrate 12 includes a second display region corresponding to the first display region, wherein the second substrate 12 expose the non-display region of the first substrate 10. Also, although not shown, a plurality of gate lines and a plurality of data lines are formed in the first display region, and a plurality of gate pads and a plurality of data pads in the non-display region are connected to the plurality of gate lines and the plurality of data lines, respectively.

The plurality of gate pads and the plurality of data pads are connected to a printed circuit board (PCB) 40 through a flexible printed circuit (FPC) 20 having a plurality of driving integrated circuits (IC) 22. Although not shown, a timing controller, a power supply unit, and a gamma voltage generator are packaged in the PCB 40. Each of the plurality of driving ICs 22 includes a gate driving IC (not shown) generating and outputting a scanning signal for transmitting to the plurality of the gate lines, and a data driving IC (not shown) generating and outputting an image signal for transmitting to the plurality of data lines through a signal voltage from the PCB 40.

When the LCD device 1 displays an image using the driving IC 22, a high temperature condition gradually occurs in the respective driving ICs 22. Accordingly, the life of the driving IC 22 is reduced and results in signal distortion that reduces image quality due to the effects of elevated temperatures, which reduces image quality. The size of the LCD device 1 is proportional to the number of driving ICs 22. Therefore, the more driving ICs required, the more that structures need to be provided to control temperature of the LCD device 1, specifically the more heat that needs to be removed during operation.

FIG. 2 is a simulation view showing a driving IC 22 for a LCD device according to the related art. The formality temperature of the driving IC 22 is, about 85 Celsius degrees. FIG. 2 shows a maximum exothermic temperature of the driving IC 22 of 102.7 degrees Celsius, which is much higher than the formality temperature.

Further, because the FPC with the driving IC has a very low thermal conductivity, the large amount of heat in the FPC is not readily transferred away from the driving IC.

SUMMARY OF THE INVENTION

A liquid crystal display device includes a liquid crystal display panel, a driving integrated circuit connected to the liquid crystal display panel, and a protection pad disposed on the driving integrated circuit, wherein the protection pad is formed from a material that resists heat.

In another aspect of the present invention, a method of fabricating a liquid crystal display device is provided that includes the steps of forming a liquid crystal display panel, connecting a driving integrated circuit to the liquid crystal display panel, and forming a protection pad from a heat resistant material disposing the protection pad on the driving integrated circuit.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned from practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or the like parts.

Figure 1:
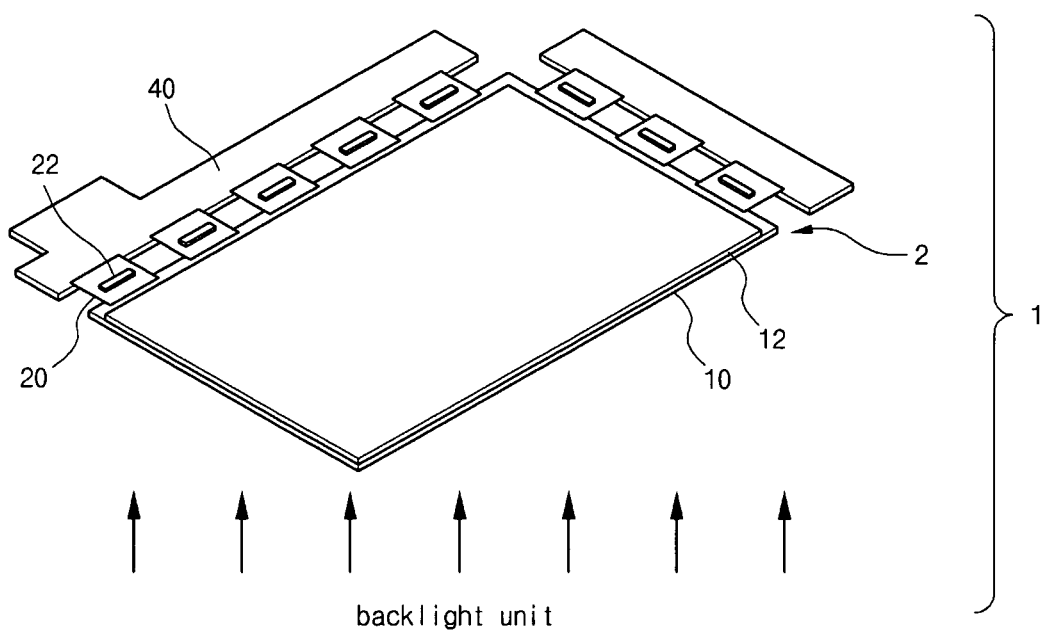
FIG. 1 is a schematic perspective view of an LCD device according to the related art.
Figure 2:
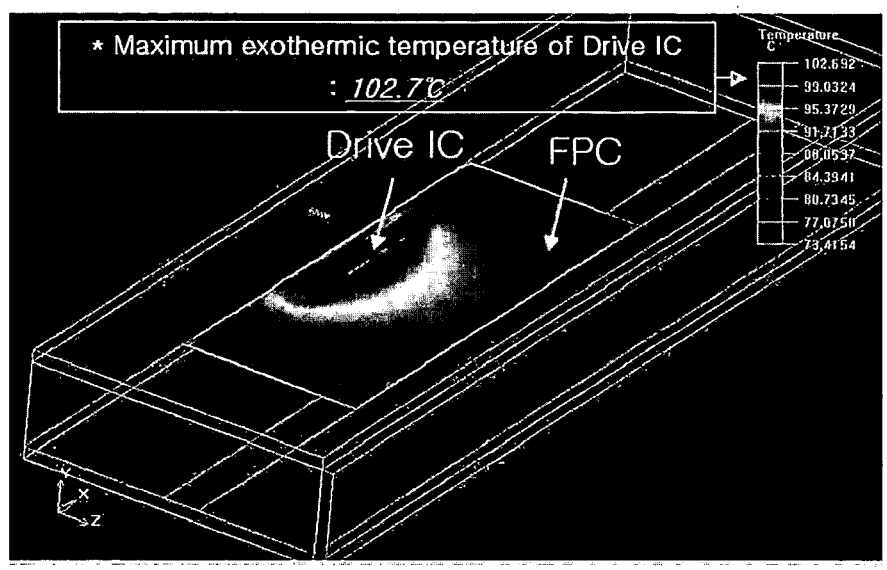
FIG. 2 is a simulation view showing a driving integrated circuit for a LCD device according to the related art.
Figure 3:
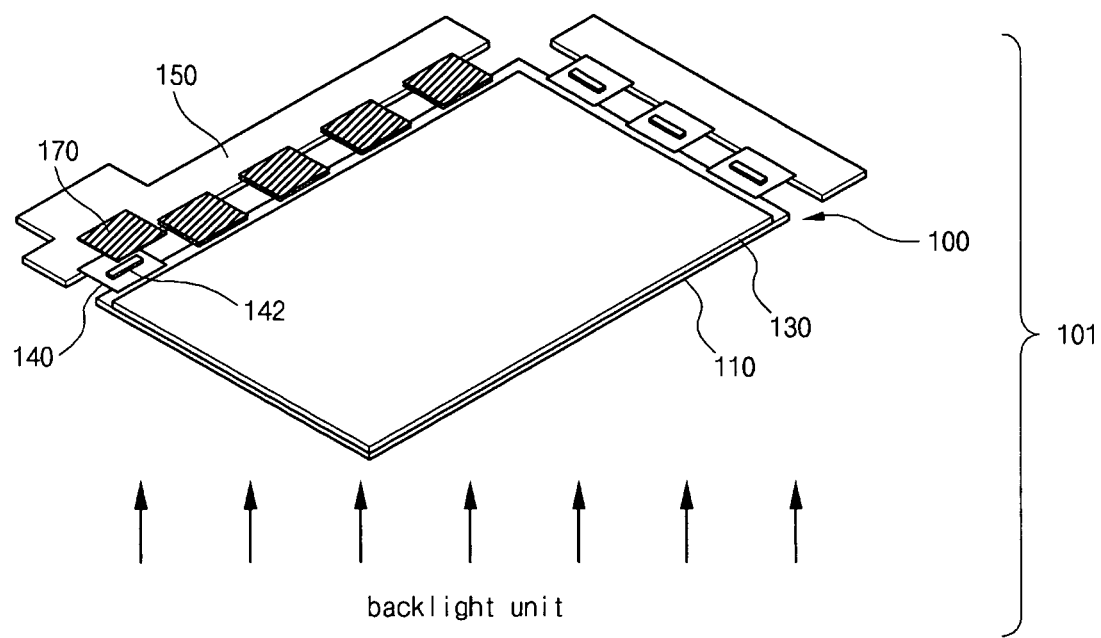
FIG. 3 is a perspective view of an LCD device according to an embodiment of the present invention.
Figure 4:
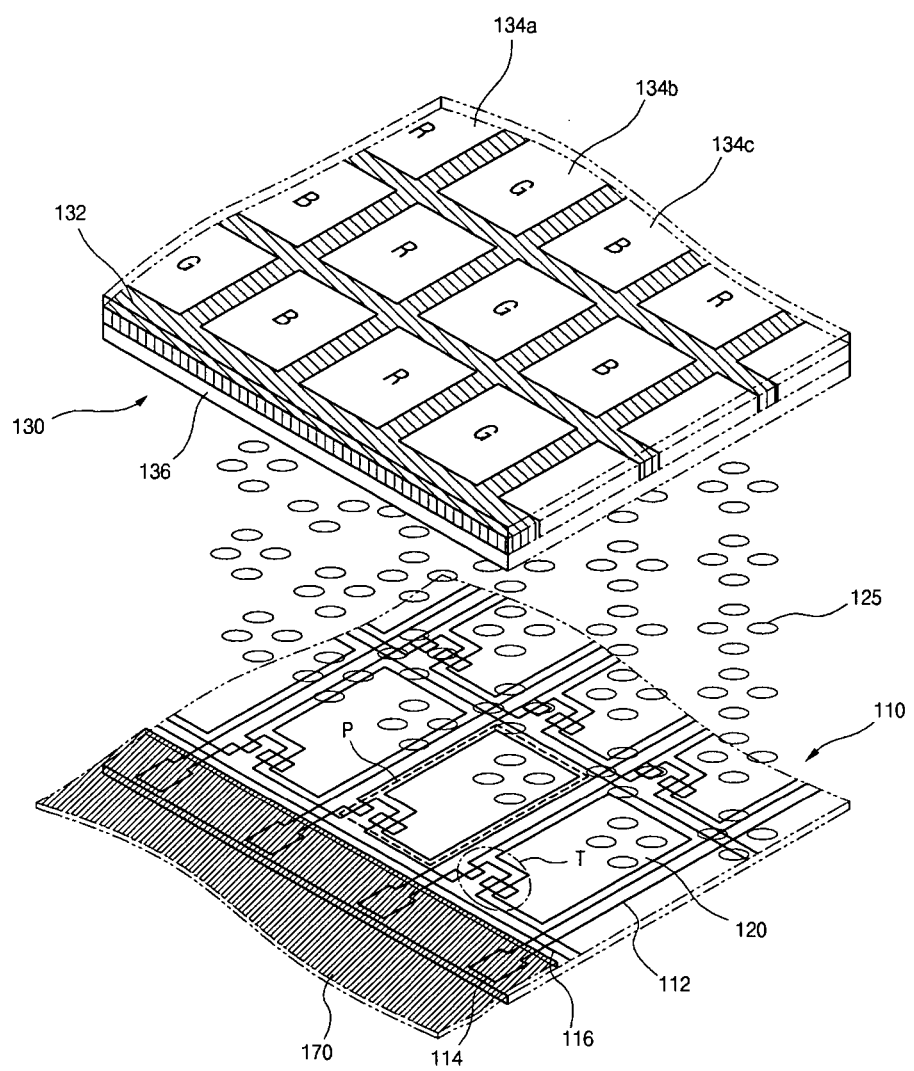
FIG. 4 is an exploded view of an LCD device of FIG. 3 according to the present invention.

FIG. 3 is a schematic perspective view of an LCD device according to an embodiment of the present invention. FIG. 4 is an exploded view of an LCD device according to the present invention. A liquid crystal display (LCD) device 101 includes an LCD panel 100 that includes a driving integrated circuit (IC) 142 that is connected to the LCD panel 100, and a protection pad 170 that is attached to an external surface of the driving IC 142. In some embodiments, the protection pad 170 may be formed from Graphite.

The LCD panel 100 includes a first substrate 110 with a first display region (not shown) and a non-display region (not shown) in a periphery of the first display region. The LCD panel 100 additionally includes a second substrate 130 that faces the first substrate 100 and includes a second display region corresponding to the first display region and is exposed to the non-display region of the first substrate 110. A liquid crystal layer (not shown) is interposed between the first and second substrates 110 and 130. The driving IC 142 is connected to the non-display region of the first substrate 110. A flexible printed circuit (FPC) 140 is disposed on the non-display region of the first substrate 110 and the driving IC 142 is mounted on the FPC 140. Additionally, a printed circuit board (PCB) 150 is connected to the FPC 140 that is disposed between the PCB 150 and the LCD panel 100, and a backlight unit is disposed under the LCD panel 100.

As shown in FIG. 4, the LCD panel 100 includes the first substrate 110, the second substrate 130 that faces the first substrate 110 and the liquid crystal layer 125 that is interposed between the first and second substrates 110 and 130. A plurality of color filters are formed on the second substrate 130. Specifically, red filters 134a, green filters 134b, and blue filters 134c form color filters. A black matrix 132 is formed in the peripheral region of the color filters. A common electrode 136 is also formed on the color filters 123a, 134b, and 134c and the black matrix 132. Each of a gate line 116, a data line 112 crossing the gate line 116 to define a pixel region P, a thin film transistor T near a crossing of the gate and data lines 112, 116, and a pixel electrode 120 connected to the thin film transistor T and disposed in the pixel region P are formed on the second substrate 130. The first substrate 110 also includes the same pixel region P as the second substrate 130. Generally, the first and second substrates 110 and 130 may be referred to as color filter substrate and array substrates, respectively.

In addition, first and second alignment layers (not shown) are formed between the liquid crystal layer 125 and respective inner surfaces of the first and second substrates 110,130, respectively. A seal pattern (not shown) is formed along edges between the first and second substrates 110 and 130 in order to prevent leakage from the liquid crystal layer 125. Further, at least one polarizer (not shown) may be attached to one of the external surfaces of the first and second substrates 110, 130, wherein the at least one polarizer acts as transmitting a polarized light.

The non-display region (not shown) of the first substrate 110 is exposed by the second substrate 130 when the first and second substrates 110, 130 are attached. A gate pad (not shown) is connected to the gate line 116 and a data pad 114 is connected to the data line 112. The gate and data pads 116, 114 are disposed in the non-display region of the first substrate 110. Multiple gate pads and the data pads 114 may be formed along with the gate line 116 and the data line 112, wherein the gate pad and the data pad 114 are connected to the PCB 150 by the FPC 140 including the driving IC 142. Specifically, the driving IC 142 includes a gate driving IC and a data driving IC, the gate pad and the data pad are connected to the gate driving IC (not shown) and the data driving IC (not shown), respectively. The protection pad 170 may be sized to cover the data pads 114.

The gate driving IC outputs a scanning signal including On/Off signals of the thin film transistor T that are transmitted to the gate line 116, and the data driving IC outputs an image signal that is transmitted to the data line 112. Namely, when the thin film transistor T, which is selected by the logic of the respective gate lines 116, becomes On with an On signal of the gate line 116, the image signal of the data line 112 is transmitted to the pixel electrode 120. Therefore, the arrangement direction of the liquid crystal molecules between the pixel electrode 120 and the common electrode 136 is modified, and then transmittance rate differs from an Off state. The driving IC 142 may include a packaging semiconductor type of chip.

The protection pad 170 includes a sheet of protection material, such as Graphite, and a coating layer covering the sheet, wherein the coating layer includes flexible a polymer resin. Therefore, the entire protection pad 170 may be flexible. The protection pad 170 according to the present invention may be attached on the driving IC 142. The protection pad 170 may include a plurality of protection pad patterns, and the driving IC 142 may include a plurality of driving IC patterns, wherein each of the plurality of protection pad patterns may be independently attached to each of plurality of driving IC patterns.

Figure 5:
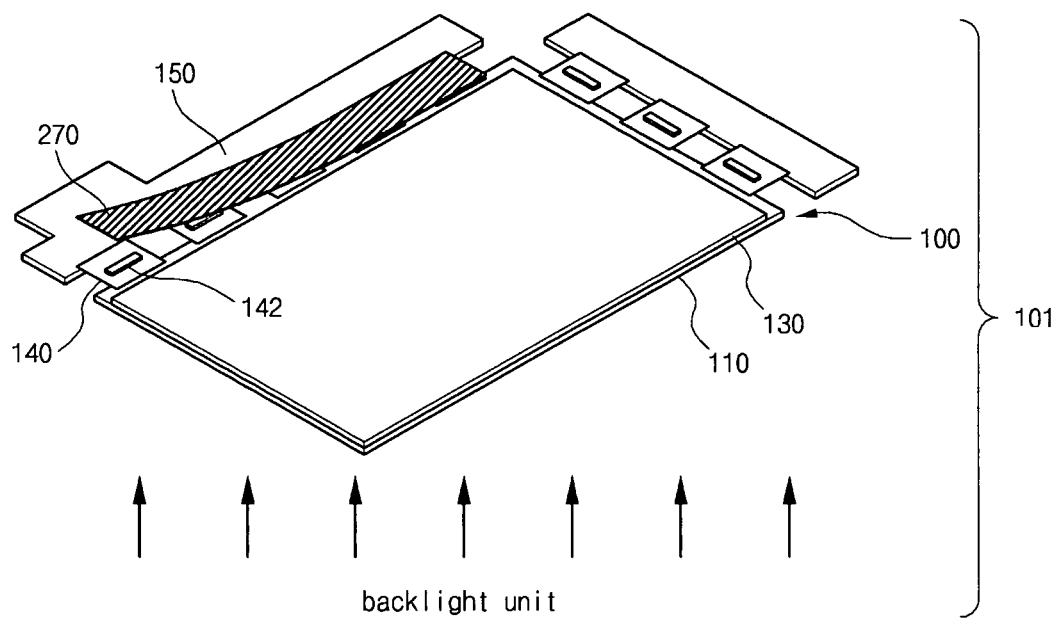
FIG. 5 is a perspective view of an LCD device according to an embodiment of the present invention.

Alternatively, the driving IC 142 may include a plurality of driving IC patterns, wherein the protection pad 170 may cover at least two of the plurality of driving IC patterns. For example, the protection pad 170 may cover the driving IC 142 including a plurality of driving IC patterns, such as the as a band type shown in FIG. 5. For example, the protection pad 170 may be disposed on the driving IC 142. In other words, the protection pad 170 may be disposed on the FPC 140 as well as on the driving IC 142.

It should be noted that the protection pad 170 may be formed from Graphite or another material with a relatively high thermal conductivity so that the heat generated within the driving IC 142 may be effectively removed. The thermal conductivity of Graphite is between about 400 Watts/meter Kelvin (W/mk) and about 800 W/mk. In comparison, the thermal conductivity of Aluminum is between 100 W/mk and 200 W/mk. Therefore, forming the protection pad 170 from Graphite provides for greater heat removal than the materials that are typically used. Accordingly, a protection pad 170 manufactured from Graphite provides for more heat removal than the related art.

In addition, in embodiments where the LCD panel 100 is provided with a backlight unit as a light source, the PCB 150 is preferably bent on the back surface using the bending property of the FPC 140 connected to the PCB 150. The LCD panel 100 according to the present invention includes a flexible protection pad 170, the driving IC 142 that is attached the protection pad 170 can maintain an original state and bend as desired. Further, the protection pad 170 may be simply attached the driving IC 142 using a bonding agent.

To obtain the desired protection against heat using the protection pad 170 without disturbing the modulation process, the thickness of the protection pad 170 preferably should be within about 0.1 millimeter to about 0.2 millimeter. The protection pad 170 may cover the FPC 140 as well as the driving IC 142. Alternatively, the protection pad 170 may cover a respective FPC 140 or each of the FPCs 140.

The protection pad 170 is attached on the driving IC 142 and is connected to a relatively long edge such as an edge of a data driving IC (not shown). However, the protection pad 170 may alternatively be attached to one of the driving ICs 142 on another edge having a small length as well as the edge having the long length. In other words, the protection pad 170 may be attached to a gate driving IC as well as the data driving IC. In addition, the protection pad 170 may be applied to a chip on glass (COG) type LCD device such that the driving IC 142 is directly mounted on the LCD panel 100.

Figure 6:
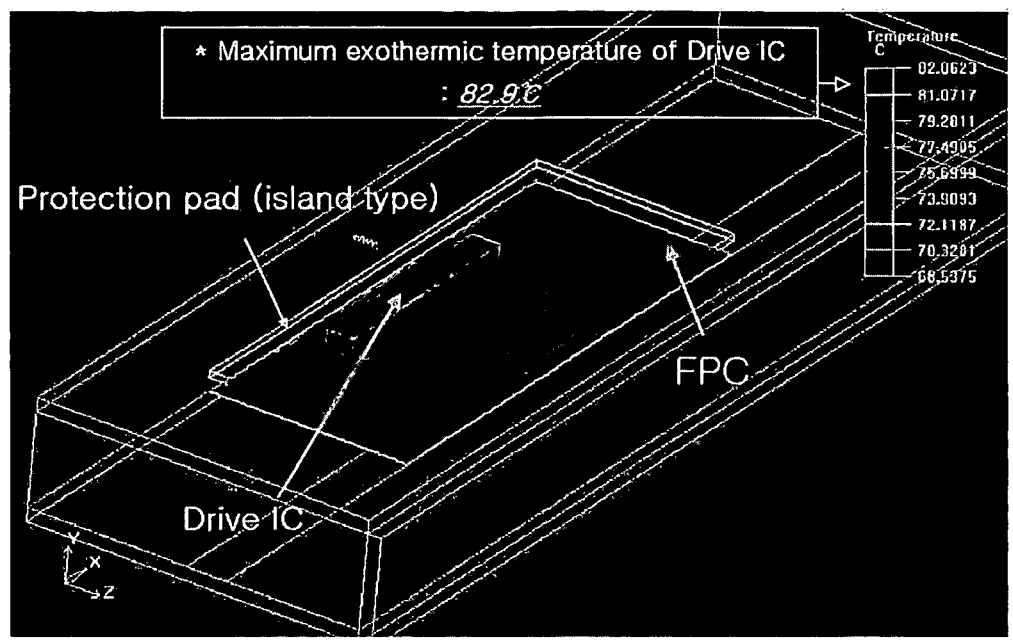
FIG. 6 is a first simulation of the temperature of a driving integrated circuit attached to a protection pad according to an embodiment of the present invention.
Figure 7:
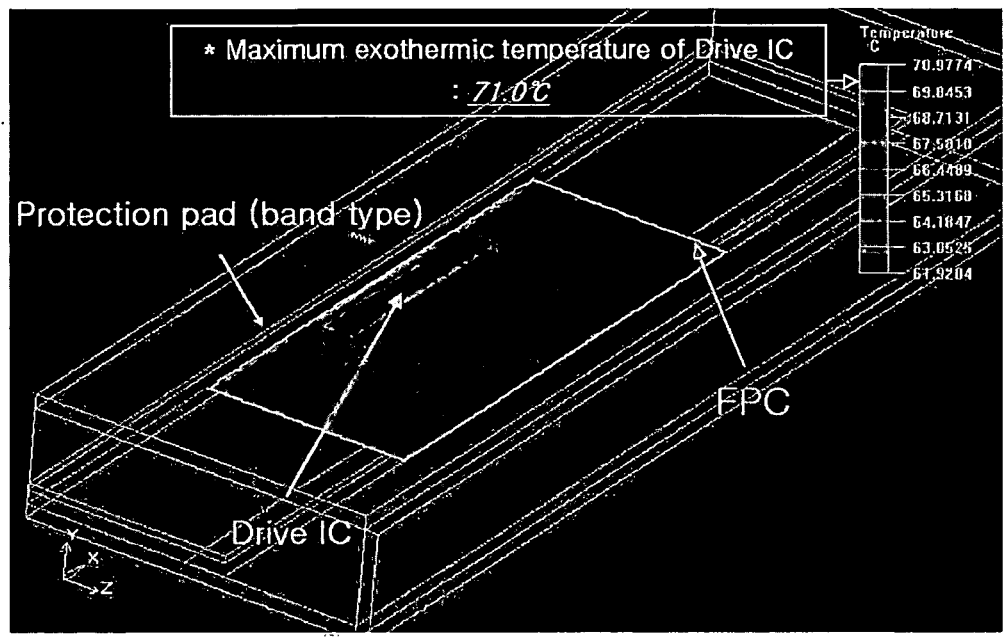
FIG. 7 is a second simulation of the temperature of a driving integrated circuit attached to a protection pad according to an embodiment of the present invention.

FIGS. 6 and 7 are simulations that show a temperature of a driving IC that is attached to a protection pad according to the present invention. FIG. 6 shows a simulation of the temperature when a separate protection pad corresponds to each driving IC 142. FIG. 7 shows a simulation of temperature when a single protection pad corresponds to the entire driving IC 142.

As shown in FIG. 6 the maximum exothermic temperature of 82.9 degrees Celsius is reached when separate protection pads correspond to each driving IC 142. As shown in FIG. 7, the maximum exothermic temperature of 71.0 degrees is reached when a single protection pad corresponds to the entire driving IC 142. These values are less than 85 degrees Celsius formality temperature, thereby providing excellent protection for the protection pad 170 against heat.

Although not shown, a method of fabricating a liquid crystal display device is provided. The method includes the steps of forming a liquid crystal display panel and connecting a driving integrated circuit to the liquid crystal display panel. Furthermore, the method includes the steps of forming a protection pad selected from a protection material against heat and disposing the protection pad on the driving integrated circuit.

The step of forming the protection pad includes the step of forming a sheet of Graphite and forming a coating layer of polymer resin to attach the protection pad and the driving integrated circuit. The step of disposing the protection pad includes the step of attaching the protection pad to the driving integrated circuit.

As explained above, the LCD device including the driving IC attached the protection pad according to the present invention provides an advantage that an effect of protection against heat can be improved. Therefore, the signal distortion due to a thermalization is prevented as well as the life extension of the driving IC, thereby obtaining an LCD device having an improved image quality and ability.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   (a) a liquid crystal display panel having a data pad;
   (b) a printed circuit board;
   (c) a plurality of flexible printed circuit boards disposed between the liquid crystal display panel and the printed circuit board, a plurality of gaps defined between adjacent ones of the flexible printed circuit boards;
   (d) a plurality of driving integrated circuits connected to the liquid crystal display panel,
   wherein the liquid crystal display panel includes a first substrate having a first display region and a first non-display region surrounding a periphery of the first display region, a second substrate facing the first substrate, the second substrate having a second display region that exposes the first non-display region of the first substrate, and a liquid crystal layer interposed between the first and second substrates,
   wherein the driving integrated circuits are connected to the liquid crystal display panel in the first non-display region of the first substrate, wherein the flexible printed circuit boards are disposed in the first non-display region of the first substrate, and wherein the driving integrated circuits are mounted on the flexible printed circuit boards; and
   (e) a plurality of protection pads disposed on the driving integrated circuits and the data pad,
   wherein the protection pads are formed from Graphite, each comprise flexible coating layer, and cover the driving integrated circuits without covering the gaps between the adjacent ones of the flexible printed circuit boards.

2. The device of claim 1, wherein the flexible coating layer comprises a polymer resin.

3. The device according to claim 1, wherein the protection pad-is pads are flexible.

4. The device according to claim 1, wherein the protection pads cover the flexible printed circuit boards.

5. The device according to claim 1, wherein the driving integrated circuits each include a packaged semiconductor.

6. The device according to claim 1, wherein a thickness of the protection pads is between about 0.1 millimeter and about 0.2 millimeter.

7. The device according to claim 1, wherein the protection pads are formed of a material with a thermal conductivity between about 400 Watts/meter Kelvin (W/mk) and about 800 W/mk.

8. A method of fabricating a liquid crystal display device, comprising the steps of:

(a) forming a liquid crystal display panel having a data pad;
(b) connecting a plurality of driving integrated circuits to the liquid crystal display panel,
wherein the liquid crystal display panel includes a first substrate having a first display region and a first non-display region surrounding a periphery of the first display region, a second substrate facing the first substrate, the second substrate having a second display region that exposes the first non-display region of the first substrate, and a liquid crystal layer interposed between the first and second substrates, wherein the plurality of driving integrated circuits are connected to the liquid crystal display panel in the first non-display region of the first substrate,
wherein a plurality of flexible printed circuit boards are disposed in the first non-display region of the first substrate and define a plurality of gaps between adjacent ones of the flexible printed circuit boards, and wherein the plurality of driving integrated circuits are mounted on the flexible printed circuit boards;
(c) forming a plurality of protection pads from a material that limits the maximum temperature of the protection pads; and
(d) disposing the protection pads on the driving integrated circuits and the data pad without covering the gaps between the adjacent ones of the flexible printed circuit boards,
wherein the protection pads are formed from Graphite, and each comprise a flexible coating layer.

9. The method according to claim 8, wherein the step of forming the protection pads on the driving integrated circuits and the data pad includes the steps of forming a sheet of Graphite, and forming a coating layer of polymer resin to attach the protection pads and the driving integrated circuits.

10. The method according to claim 8, wherein the step of disposing the protection pads on the driving integrated circuits and the data pad includes the step of attaching the protection pads on the driving integrated circuits.

11. A liquid crystal display device, comprising:
(a) a liquid crystal display panel having a data pad;
(b) a printed circuit board;
(c) a plurality of flexible printed circuit boards disposed between the liquid crystal display panel and the printed circuit board, a plurality of gaps defined between adjacent ones of the flexible printed circuit boards;
(d) a plurality of driving integrated circuits connected to the liquid crystal display panel,
wherein the liquid crystal display panel includes a first substrate having a first display region and a first non-display region surrounding a periphery of the first display region, a second substrate facing the first substrate, the second substrate having a second display region that exposes the first non-display region of the first substrate, and a liquid crystal layer interposed between the first and second substrates,
wherein the driving integrated circuits are connected to the liquid crystal display panel in the first non-display region of the first substrate, wherein the flexible printed circuit boards are disposed in the first non-display region of the first substrate, and wherein the driving integrated circuits are mounted on the flexible printed circuit boards; and
(e) a plurality of protection pads disposed on the driving integrated circuits and the data pad, wherein the protection pads are formed from Graphite and each comprise a flexible coating layer,
wherein the printed circuit board and the first substrate have opposing longitudinal edges, the driving integrated circuits disposed between the longitudinal edges of the printed circuit board and the first substrate.

12. The liquid crystal display device according to claim 11, wherein the protection pads cover the driving integrated circuits without covering the gaps between the adjacent ones of the flexible printed circuit boards.

* * * * *